United States Patent [19]

Welburn

[11] 4,306,181

[45] Dec. 15, 1981

[54] DRIVE CIRCUITRY FOR ELECTRIC MOTOR

[75] Inventor: Ross Welburn, Santa Rosa, Calif.

[73] Assignee: Compumotion Corporation, Petaluma, Calif.

[21] Appl. No.: 67,364

[22] Filed: Aug. 17, 1979

[51] Int. Cl.³ ............................................. G05B 19/40
[52] U.S. Cl. ................................. 318/696; 318/599; 318/432
[58] Field of Search .............. 318/685, 696, 432, 599, 318/674, 678, 681

[56] References Cited

U.S. PATENT DOCUMENTS

| | | | |
|---|---|---|---|
| 3,686,557 | 8/1972 | Futamura | 318/599 |
| 3,824,440 | 7/1974 | McIntosh | 318/696 |
| 4,006,391 | 2/1977 | Deering et al. | 318/599 |
| 4,163,931 | 8/1979 | Seitz et al. | 318/599 |

*Primary Examiner*—J. V. Truhe
*Assistant Examiner*—Eugene S. Indyk
*Attorney, Agent, or Firm*—Flehr, Hohbach, Test, Albritton & Herbert

[57] ABSTRACT

A drive circuit for an inductive load such as a synchronous motor responds to an analog signal representing a desired load current and an actual load current and selectively applies first and second potentials to the load. The circuit includes transistor switches for selectively connecting the load to the potentials in desired polarity and diode circuits for maintaining current flow through the load when the transistor switches are opened, thereby decaying the load current.

11 Claims, 4 Drawing Figures

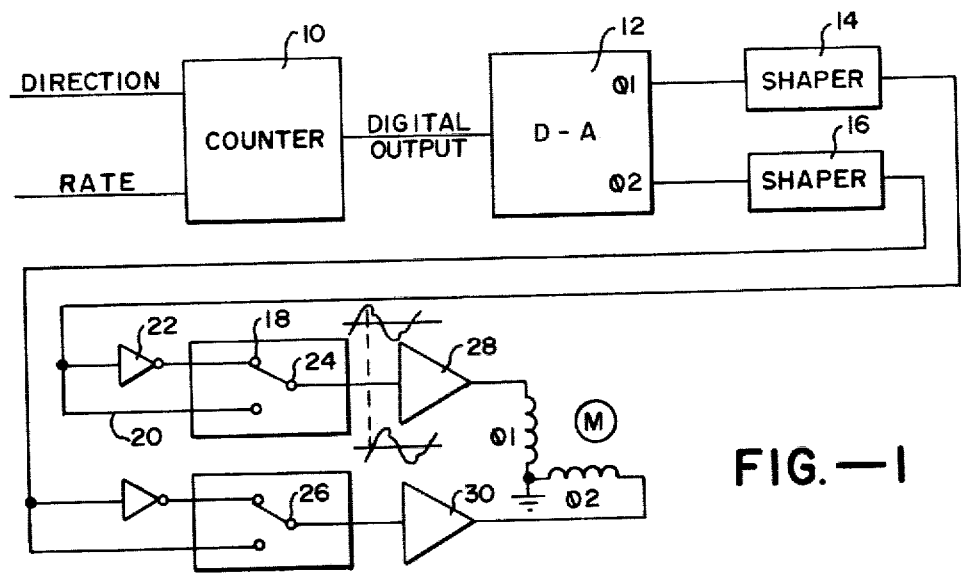
FIG.—1
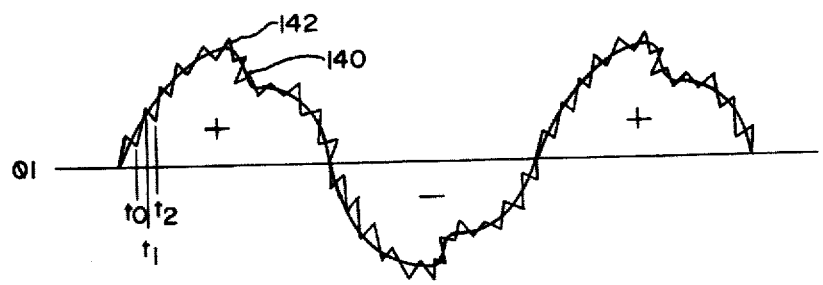
FIG.—3
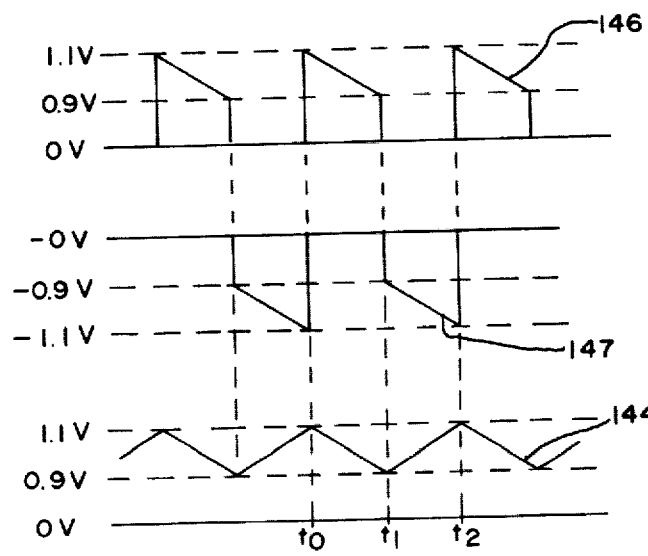
FIG.—4

DRIVE CIRCUITRY FOR ELECTRIC MOTOR

This application is related to copending application Ser. No. 067,363 filed Aug. 17, 1979, for SYNTHESIZER FOR MOTOR CONTROL SIGNAL, assigned to the present assignee.

This invention relates generally to electric motor control circuits, and more particularly the invention relates to circuits for driving a motor in response to a control signal of unique configuration.

In driving stepping motors and other synchronous motors the field windings are energized in sequential steps which cause the armature of the motor to rotate in a corresponding step by step manner. Numerous control circuits have been designed which respond to direction and speed or rate input signals and provide a control signal to power amplifiers which energize field windings and drive the motor. For example, U.S. Pat. No. 4,087,732, issued May 2, 1978, for DIGITAL STEPPING MOTOR DEVICE CIRCUIT discloses control circuitry which generates a control signal in steps of equal amplitude but unequal duration. Moreover, the control circuit can be altered to compensate for motor non-linearities and provide more uniform torque and rotation smoothness.

Driver circuitry responsive to synthesize control signals for providing field excitation current in incremental steps are known. U.S. Pat. No. 3,885,210, issued May 20, 1975, for DRIVE CIRCUITS FOR STEPPING MOTORS employs current controllers in series with the field winding auxiliary motor to vary the winding current. U.S. Pat. No. 3,750,000, issued July 31, 1973, for STEPPING MOTOR EXCITING APPARATUS AND METHOD discloses a driving circuit in which a switching transistor is serially connected with the motor windings across a voltage potential with the conductivity of the transistor being pulsed on and off. U.S. Pat. No. 3,842,332, issued Oct. 15, 1974, for FIVE PHASE STEPPING MOTOR SYSTEMS discloses a bridge type circuit for energizing serially connected stator windings.

While a number of circuit arrangements have been heretofore provided for energizing the windings of a stepping motor, prior art circuits encounter difficulties in applying high voltages with high switching frequencies. The difficulties are particularly acute in energizing a two phase motor.

An object of the present invention is an improved driver means for an electrical motor.

Another object of the invention is improved driver circuitry which is operable with two phase motors.

Yet another object of the invention is driver circuitry which can be utilized with high voltages.

In accordance with the present invention drive means is provided which is responsive to an analog control signal representative of a desired current and to an analog signal which is representative of actual load current. First means is provided for receiving and comparing the two analog signals, and second means responsive to the first means is provided for increasing current through the load when the magnitude of the actual signal is less than the magnitude of the desired signal and for decreasing current of the load when the magnitude of the actual signal is greater than the magnitude of the desired signal. The second means includes transistor means serially connected with the load and means is provided for rendering the transistor means conductive when the magnitude of the actual voltage is less than the magnitude of the desired voltage. Diode means is serially connected with the load for maintaining current flow through the load when the transistor means is rendered non-conductive.

In operation, the field winding is connected across a voltage potential by a bridge circuit whereby the polarity of the field winding can be switched at a high frequency. Switching pulses for controlling the bridge circuit are generated in response to a comparison by the first means of the control signal representative of the desired current and the signal representative of the actual current. The switching rate is controlled by an oscillator signal applied to the first means.

The invention and objects and features thereof will be more readily apparent from the following detailed description and appended claims when taken with the drawings.

In the drawings,

FIG. 1 is a functional block diagram of conventional stepping motor control circuitry.

FIG. 3 is a curve representing desire field winding current and a curve representing actual field winding current generated with the driver circuitry of FIG. 2.

FIG. 4 is a plot of voltages in the schematic of FIG. 2 useful in explaining the generation of the actual current wave in FIG. 3.

Figure 2:
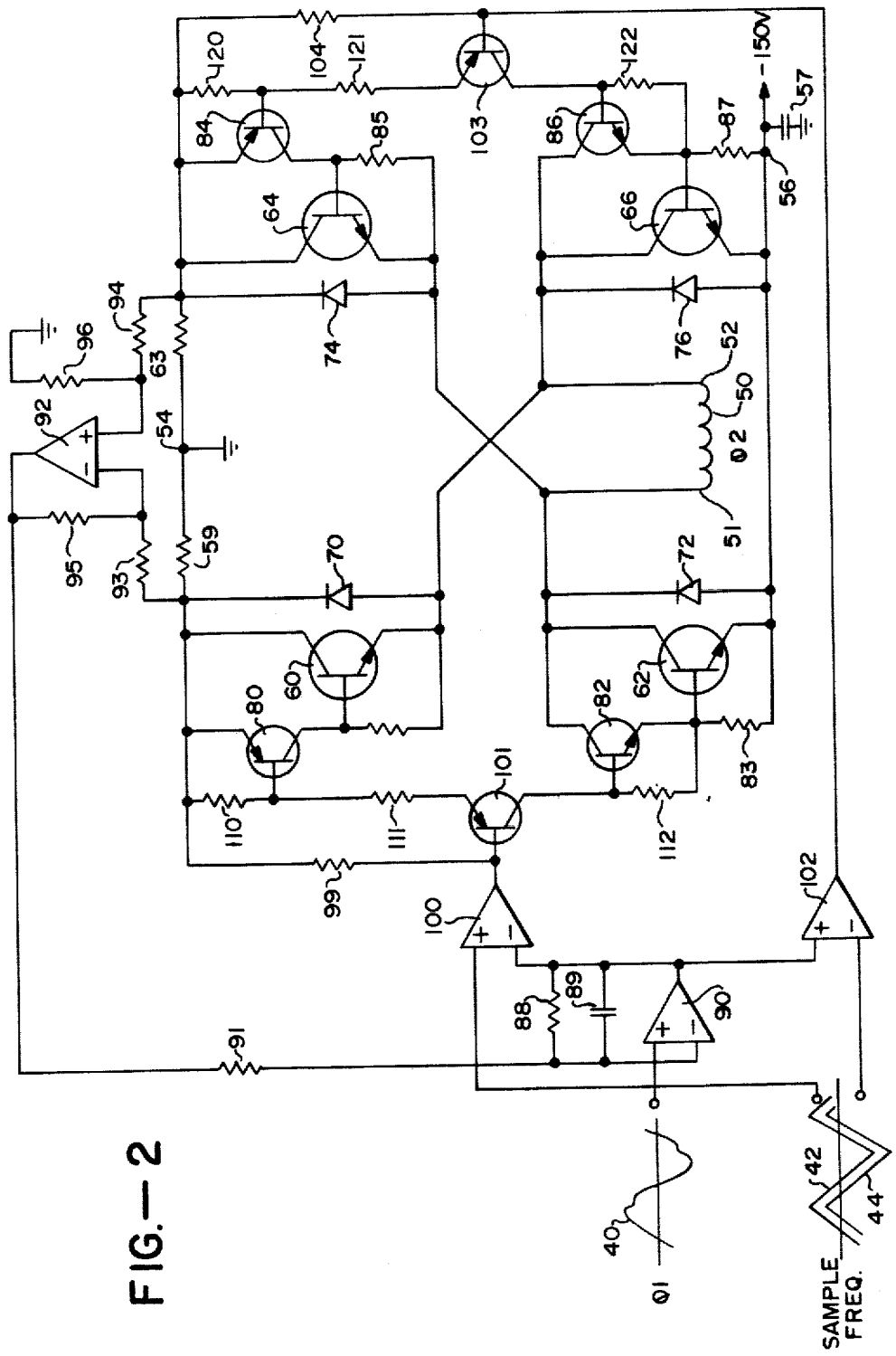
FIG. 2 is a schematic of one embodiment of drive circuitry for a motor in accordance with the present invention.

Referring now to the drawings, FIG. 1 is a functional block diagram of control circuitry for a synchronous motor device as disclosed in co-pending application Ser. No. 067,363, supra. The circuit includes an up-down counter 10 which responds to a direction of rotation signal and a rate or speed signal to generate a count. Each count has associated therewith a digital word indicative of the magnitude of field current for a particular position of the motor rotor. For example, the counter may have associated therewith a number of positions of a full wave of field current. The magnitude of the field current at the associated position of the counter is indicated by the digital word, and the digital word is applied to a digital to analog converter 12 which converts the digital words to an analog signal. In this particular embodiment the circuitry drives a two phase motor, and as taught in co-pending application Ser. No. 067,363, supra, the output of the digital to analog converter 12 is applied to wave shapers 14 and 16 which may apply any necessary distortion to the analog signal to correct for distortion in the magnetic and torque characteristics of the motor. For example, the shapers may comprise non-linear operational amplifiers, a diode and resistor network, or other suitable means to effect the desired distortion. The output signals from shapers 14 and 16 will have essentially the same shape with one output leading the other output by one-fourth cycle or ninety electrical degrees. Assuming that the output signal from the shapers varies from a minimum value of zero to a maximum value, the signal can be applied to an analog multiplexer 18 directly through line 20 or through an inverter 22 with switches 24 and 26 of multiplexer 18 alternating between line 20 and the inverter 22 to generate an alternating current wave as illustrated. The control signals from multiplexer 18 are then applied to power amplifiers 28 and 30 to drive the field windings 32 and 34 of the motor 36.

In accordance with the present invention driver circuitry is provided which responds to a control signal and drives a motor field winding from a high potential source and at a high sampling rate to effect smooth operation of the motor.

FIG. 2 is a schematic diagram of one embodiment of driver circuitry in accordance with the present invention. The circuitry responds to a control signal 40 representing the desired field winding current and triangular sampling signals 42 and 44 and applies current to the field winding 50 having terminals 51 and 52 which are connected by a bridge network between a first potential 54 (ground) and a second potential 56 (−150 volts d.c.). The bridge circuitry responds to the control signal 40 and sampling signals 42, 44 and drives the field winding to energize the field winding in a sequential step by step manner which causes the armature of the motor to rotate smoothly in a corresponding step by step manner. Signals 42 and 44 are at a high frequency (e.g. 20 K Hz), and the signals are offset to prevent concurrent conduction of the bridge circuitry and provide a safe "dead time". Signals 42 and 44 are generated by a separate oscillator whereby the frequency of both phases do not drop into the audio range and prevents the generation of a heterodyne or beat frequency between the regulators for the two phases.

The bridge circuit comprises a first conductive path defined by the serially connected resistor 59, transistor 60, field winding 50, and transistor 62. A second conductive path of the bridge circuit comprises serially connected resistor 63, transistor 64, field winding 50, and transistor 66. The polarity of the field winding 50 is reversed in the two conductive paths. In addition, each of transistors 60, 62, 64 and 66 is shunted by one of diodes 70, 72, 74 and 76, respectively.

The conduction of transistor 60 is controlled by transistor 80 and resistor 81 which are serially connected across the emitter and collector of transistor 60 with a common terminal thereof connected to the base of transistor 60. Similarly, the conduction of transistor 62 is controlled by transistor 82 and resistor 83 which are serially connected across the emitter and collector of transistor 62 with the common terminal thereof connected to the base of transistor 62. Transistor 84 is serially connected with resistor 85 across transistor 64 with a common terminal thereof connected to the base of transistor 64, and transistor 86 and resistor 87 are serially connected across transistor 66 with a common terminal thereof connected to the base of transistor 66.

The control signal 40 of the desired waveform is applied to the plus input of differential amplifier 90 with a feedback signal from the bridge applied to the minus terminal of error amplifier 90. Resistor 88 and capacitor 89 define a filter for removing the sampling frequency from the feedback signal. The feedback signal is generated by differential amplifier 92 which has inputs taken from respective terminals of resistors 59 and 63 through resistors 93 and 94, respectively. Suitable biasing for the input terminals of differential amplifier 92 is provided by resistor 95 which shunts the differential amplifier and resistor 96 which is connected to ground. The output of differential amplifier 92 is connected through resistor 91 to an input of amplifier 90.

The output of differential amplifier 90 is applied to input terminals of comparators 100 and 102 with the sampling frequency signals 42 and 44 connected to other inputs of the comparators 100 and 102, respectively. Comparators 100, 102 function as pulse width modulators in comparing the samping signals and the amplified error signal. For example, the output of comparator 100 will have a 50% duty cycle for a zero volt or ground output from the error amplifier, when the error signal becomes positive, the duty cycle of comparator 100 increases thus increasing current error signal which becomes negative, the duty cycle for comparator 102 increases thus increasing current in the bridge which is controlled by comparator 102.

The output of comparator 100 is connected to the base of transistor 101 whereby a negative output renders transistor 101 conductive which in turn forward biases the emitter-base junctions of transistors 80 and 82 through the series conductive path defined by resistors 59, 110, 111, 112 and 83. The conduction of transistors 80 and 82, in turn, renders transistors 60 and 62 conductive. Conversely, the application of a positive signal from comparator 100 to the base of transistor 101 renders transistors 60 and 62 non-conductive. Resistor 99 connects the base of transistor 101 through resistor 59 to ground.

Similarly, the output of comparator 102 is applied to the base of transistor 103 to control its conductivity. Resistor 104 connects the base terminal through resistor 63 to ground. The application of a negative voltage on the base of transistor 103 forward biases transistors 84 and 86 through the voltage divider circuit comprising resistors 63, 120, 121, 122 and 87. The conduction of transistors 84 and 86, in turn, renders transistors 64 and 66 conductive.

Operation of the driver circuitry can best be understood by considering the field winding current shown in FIG. 3 and the feedback current illustrated in FIG. 4. Referring to FIG. 3, the desired field winding current is illustrated by curve 140 with the actual field winding current illustrated by curve 142. As illustrated by curve 142, the driver circuitry responds to the control signal 40 and the feedback signal from the bridge to switch the polarity of the field winding across the voltage potential to effect a change in field winding current to approximate the desired current 140. It will be appreciated that changes in the actual field winding current curve 142 occur at the sampling frequency (e.g. 20 kilohertz) but for purposes of illustration the changes in the actual field winding current 142 are reduced in number.

Referring to FIG. 3, at the time T0 the actual field winding current 142 is below the desired field winding current curve 140, and the field winding is connected across the voltage potential whereby the current increases until time T1 when the actual current is greater than the desired current. Thereupon, the driver circuitry reverses the polarity of the field winding through the bridge circuit whereby the field winding current decreases. At time T2 the actual field winding current 142 is below the desired current 140 and again the field winding is connected by the bridge across the voltage potential to increase the actual current.

In operation, during the positive half cycles of field winding current, transistors 60 and 62 are rendered conductive to increase the field winding current. Field winding 50 is connected across the voltage potential with current flowing from terminal 52 to terminal 51. To decrease the field winding current during the positive half cycles the transistors 60 and 62 are rendered non-conductive and the current flowing through winding 50 decreases by reversing polarity of the winding with the current flowing through diode 76, field winding 50, and diode 74. Thus, the instantaneous current through the field winding decreases by the reverse polarity of the winding effected by diodes 74 and 76.

Similarly, during the negative half cycles of field winding current, transistors 64 and 66 are rendered conductive to increase the negative flow of current, and diodes 72 and 70 reverse the field winding polarity when transistors 64 and 66 and non-conductive.

The feedback signal generated by differential amplifier 92 is illustrated by curve 144 in FIG. 4. The feedback signal is generated in response to the voltage developed across the current sense resistor 59, which can be represented by the curve 148 of FIG. 4, and the voltage developed across current sense resistor 63, which can be represented by the curve 146 of FIG. 4. As shown in FIG. 3 and FIG. 4 at time T$\phi$ field current begins increasing due to the conduction of transistors 60 and 62 with the current sense voltage drop across resistor 59 applied to the minus terminal of amplifier 92 going from zero to a negative value as illustrated by curve 148 of FIG. 4. At time T$\phi$ the output 144 of amplifier 92 representing winding current, is at minimum due to the dissipated inductive voltage of the field winding 50. At time T1 the field winding current 142 exceeds the desired field winding current 140 and transistors 60 and 62 become non-conductive. The signal input to the minus terminal drops to zero. Thereupon, the polarity of the field winding 50 is reversed through diodes 76 and diode 74 with the signal 146 input to the plus terminal of amplifier 92 stepping to a maximum positive value and decaying to time T2 as the current of the winding 50 is returned back to the power supply capacitor 57.

During the positive half cycle of motor winding current the reference signal 40 is higher than the feedback voltage from differential amplifier 92. The output from error amplifier 90 becomes more positive when compared to the samping frequency signal in comparator 100, thus increasing the duty cycle or on time of comparator 100. The increasing duty cycle increases the current through winding 50 until the feedback signal equals the reference signal input.

Similarly, a negative half cycle of the field winding current is generated by controlling the conduction of transistors 64 and 66 through comparator 102. The duty cycle of comparator 102 increases as the reference input has a greater negative value than the feedback voltage. The error amplifier output becomes more negative, thus increasing the duty cycle or on time of comparator 102. Conduction of transistors 64 and 66 increases the magnitude of the negative current, and the negative current is reduced by reversing the field winding polarity through diodes 70 and 72.

An identical driver circuit is provided by the second phase of a two phase motor with the control signal therefor offset by ninety electrical degrees for the phase difference.

In one embodiment the following component values (in ohms and microfarads) were used:

| 59 | 0.2 | 88 | 47K |
|---|---|---|---|
| 60 | MJE 13006 | 89 | 0.01 |
| 62 | MJE 13006 | 90 | IC 774 |
| 63 | 0.2 | 91 | 1K |
| 64 | MJE 13006 | 92 | IC 774 |
| 66 | MJE 13006 | 93 | 1K |
| 70 | IN 4935 | 94 | 1K |
| 72 | IN 4935 | 95 | 2.49K |
| 74 | IN 4935 | 96 | 2.49K |
| 76 | IN 4935 | 99 | 1K |

-continued

| 80 | MJE 350 | 100 | LM 139 |
|---|---|---|---|
| 81 | 150 | 102 | LM 139 |
| 82 | MJE 340 | 103 | MJE 350 |
| 83 | 150 | 104 | 1K |
| 84 | MJE 350 | 110 | 150 |
| 85 | 150 | 111 | 220 |
| 86 | MJE 340 | 112 | 150 |
| 87 | 150 | 120 | 150 |
|  |  | 121 | 220 |
|  |  | 122 | 150 |

While the driver circuitry has proved to be particularly useful with two phase stepping motors, the driver can be employed with single phase or poly phase motors, also. Thus, while the invention has been described with reference to a preferred embodiment in a two phase application, the description is illustrative of the invention and is not to be construed as limiting the invention. Various modifications and applications may occur to those skilled in the art without departing from the true spirit and scope of the invention as defined in the appended claims.

What is claimed is:

1. Drive means for an inductive load responsive to a desired current configuration comprising
    a first voltage potential,
    a second potential,
    a first differential amplifier having a first input connected to receive an analog signal representative of desired current and a second input interconnected for receiving a signal representative of actual current,
    second means responsive to the first differential amplifier for increasing current through said load when the magnitude of the actual current is less than the magnitude of the desired current and for decreasing current through the load when the magnitude of the actual current is greater than the magnitude of the desired current,
    said second means including transistor means serially connected with said load between said first and second potentials, said transistor means including a first transistor means serially connected with said load for conducting current through said load in one direction and a second transistor means serially connected with said load for conducting current through said load in an opposite direction, means for rendering said transistor means conductive when the magnitude of the actual current is less than the magnitude of the desired current, and diode means serially connected with said load between said first and second potentials for maintaining current flow through said load when said transistor means is rendered non-conductive,
    said second means further including a second differential amplifier and a third differential amplifier each having a first input interconnected to receive an output voltage from said first differential amplifier and having a second input interconnected to receive one of two triangular sampling signals from an oscillator which define a sampling frequency, said sampling signals being offset to prevent concurrent conduction of said first transistor means and said second transistor means, the output of said second differential amplifier controlling the conduction of said first transistor means and the output of said third differential amplifier controlling the conduction of said second transistor means.

2. Drive means for an inductive load as defined by claim 1 wherein said diode means includes first diode means interconnected with said load for maintaining current flow through said load in said first direction when said first transistor means is rendered non-conductive, and second diode means interconnected with said load for maintaining current flow through said load in said opposite direction when said second transistor means is rendered non-conductive.

3. Drive means as defined by claim 1 wherein said first transistor means and said second transistor means comprise bridge circuits for connecting said load across said first and second voltage potentials.

4. Drive means as defined by claim 3 wherein said first transistor means includes a first transistor connecting one terminal of said load to said first voltage potential and a second transistor connecting another terminal of said load to said second voltage potential and said second transistor means includes a third transistor connecting said one terminal of said load to said second voltage potential and a fourth transistor connecting said other terminal of said load to said first voltage potential.

5. Drive means as defined by claim 4 wherein said diode means includes first, second, third, and fourth diodes connected respectively in parallel with said first, second, third, and fourth transistors.

6. Drive means as defined by claims 4 or 5 and including a first voltage divider circuit and a second voltage divider circuit, means interconnecting said first voltage divider circuit to contact terminals of said first and second transistors, means interconnecting said second voltage divider circuit to control terminals of said third and fourth transistors, said output from said second differential amplifier controlling current flow through said first voltage divider circuit, and said output from said third differential amplifier controlling current flow through said second voltage divider circuit.

7. Drive means for a two phase synchronous motor comprising means for generating a first phase control signal and a second phase control signal, said first and second phase control signals being representative of desired field currents through field windings of said motor, means for generating first and second sampling signals at a sampling frequency, first means responsive to said first phase control signal and said sampling signals to drive one phase field winding, second means responsive to said second phase control signal and said sampling signals to drive a second phase field winding, each of said first and second means including comparator means for receiving and comparing one of said control signals and a signal representative of actual field winding current, said comparator means including a first differential amplifier having a first input connected to receive said control signal and a second input interconnected for receiving a signal representative of actual current, means responsive to said comparator means for increasing current through a field winding when the magnitude of said control signal is greater than the magnitude of said signal representative of actual field winding current and for decreasing current through said field winding when the magnitude of said control signal is less than the magnitude of said signal representative of actual field winding current, said means responsive to said comparator means including transistor means serially connected with said field winding across a voltage potential, said transistor means including a first transistor means serially connected with said field winding for conducting current through said field winding in one direction and a second transistor means serially connected with said field winding for conducting current through said field winding in an opposite direction, means for rendering said transistor means conductive, and diode means serially connected with said field winding for maintaining current flow through said field winding when said transistor means is rendered non-conductive, said means responsive to said comparator means further including a second differential amplifier and a third differential amplifier each having a first input interconnected to receive an output voltage from said first differential amplifier and having a second input interconnected to receive one of said sampling signals, said sampling signals being offset to prevent concurrent conduction of said first transistor means and said second transistor means, the output of said second differential amplifier controlling the conduction of said first transistor means and the output of said third differential amplifier controlling the conduction of said second transistor means.

8. Drive means for a two phase stepping motor as defined by claim 7 wherein said diode means includes first diode means interconnected with said field winding for maintaining current flow through said field winding in said first direction when said first transistor means is rendered non-conductive, and second diode means interconnected with said field winding for maintaining current flow through said load in said opposite direction when said second transistor means is rendered non-conductive.

9. Drive means for a two phase stepping motor as defined by claim 8 wherein said first transistor means includes a first transistor connecting one terminal of said field winding to a first voltage potential and a second transistor connecting another terminal of said field winding to a second voltage potential and said second transistor means includes a third transistor connecting said one terminal of said field winding to said second voltage potential and a fourth transistor connecting said other terminal of said field winding to said first voltage potential.

10. Drive means for a two phase stepping motor as defined by claim 9 wherein said diode means include first, second, third and fourth diodes connected respectively in parallel with said first, second, third, and fourth transistors.

11. Drive means for a two phase stepping motor as defined by claim 10 and including a first voltage divider circuit and a second voltage divider circuit, means interconnecting said first voltage divider circuit to control terminals of said first and second transistors, means interconnecting said second voltage divider circuit to control terminals of said third and fourth transistors, said output from said second differential amplifier controlling current flow through said first voltage divider circuit, and said output from said third differential amplifier controlling current flow through said second voltage divider circuit.

* * * * *